(12) United States Patent
Carlson et al.

(10) Patent No.: US 12,159,971 B2
(45) Date of Patent: Dec. 3, 2024

(54) METHOD OF SYNTHESIS OF SOLID ELECTROLYTE, A SOLID-STATE ELECTROLYTE COMPOSITION, AND AN ELECTROCHEMICAL CELL

(71) Applicant: Solid Power, Inc., Louisville, CO (US)

(72) Inventors: Benjamin Carlson, Minneapolis, MN (US); Sean P. Culver, Broomfield, CO (US); Ilya Iisenker, Boulder, CO (US)

(73) Assignee: Solid Power Operating, Inc., Louisville, CO (US)

( * ) Notice: Subject to any disclaimer, the term of this patent is extended or adjusted under 35 U.S.C. 154(b) by 483 days.

(21) Appl. No.: 17/643,745

(22) Filed: Dec. 10, 2021

(65) Prior Publication Data

US 2022/0190387 A1 Jun. 16, 2022

Related U.S. Application Data

(60) Provisional application No. 63/124,226, filed on Dec. 11, 2020.

(51) Int. Cl.
*H01M 10/0568* (2010.01)
*C01B 25/14* (2006.01)
*H01M 10/0525* (2010.01)

(52) U.S. Cl.
CPC ......... *H01M 10/0568* (2013.01); *C01B 25/14* (2013.01); *H01M 10/0525* (2013.01); *C01P 2002/72* (2013.01); *H01M 2300/0068* (2013.01)

(58) Field of Classification Search
CPC ......... H01M 10/0568; H01M 10/0525; H01M 2300/0068; C01B 25/14; C01P 2002/72

USPC ........................................................ 429/322
See application file for complete search history.

(56) References Cited

U.S. PATENT DOCUMENTS

| 10,903,518 | B2 | 1/2021 | Jang et al. |
| 2017/0117585 | A1* | 4/2017 | Tutusaus ............... H01M 4/466 |
| 2020/0381773 | A1* | 12/2020 | Tsujimura ........... H01M 4/0471 |
| 2021/0253424 | A1* | 8/2021 | Lisenker ................. C01B 17/22 |

FOREIGN PATENT DOCUMENTS

| JP | 6683363 B2 | 3/2020 |
| WO | 2020/153973 A1 | 7/2020 |

OTHER PUBLICATIONS

Weifeng Shi, "Syntheses and Structures of new P/S and P/Se Metal Complexes", Universität Fridericiana zu Karlsruhe, p. 6 (Year: 2007).*

(Continued)

*Primary Examiner* — Christian Roldan
*Assistant Examiner* — Robert Gene West
(74) *Attorney, Agent, or Firm* — Polsinelli PC; Gregory P. Durbin

(57) ABSTRACT

A method of synthesizing a solid-state electrolyte where $P_2S_5$, $Na_2S$ and LiCl are dissolved in one of more solvents; where upon reacting of the mixture, NaCl precipitates out and is removed from the solution; the solvent is removed; and the sulfide solid-state electrolyte is dried, then crystallized to be used in a solid-state battery. A solid-state battery comprising the produced sulfide solid-state electrolyte is also described.

13 Claims, 3 Drawing Sheets

(56) References Cited

OTHER PUBLICATIONS

Wang, "Reaction mechanism of Li2S-P2S5 system in acetonitrile based on wet chemical synthesis of Li7P3S11 solid electrolyte", Chemical Engineering Journal 393, pp. 1-9 (Year: 2020).*
International Searching Authority, International Search Report and Written Opinion, issued in connection with corresponding International Application No. PCT/US2021/062911, mailed Apr. 7, 2022 (13 Pages).

* cited by examiner

METHOD OF SYNTHESIS OF SOLID ELECTROLYTE, A SOLID-STATE ELECTROLYTE COMPOSITION, AND AN ELECTROCHEMICAL CELL

RELATED APPLICATIONS

This application claims priority to U.S. Provisional Patent Application No. 63/124,226, filed Dec. 11, 2020, the content of which is incorporated herein by reference in its entirety.

FIELD

Various embodiments described herein relate to the field of primary and secondary electrochemical cells, electrodes and electrode materials, electrolyte and electrolyte compositions, and corresponding methods of making and using same.

BACKGROUND

Due to the rapidly increasing demand for battery technologies to have improved reliability, capacity (mAh), thermal characteristics, cycle life, and recharge performance, the world is turning to the use of lithium-based batteries, such as lithium-ion batteries and lithium solid-state batteries. The lithium solid-state battery provides an improvement in safety, packaging efficiency, while also enabling high-energy chemistries not accessible to lithium-ion batteries. However, further improvements are needed to reduce the cost associated with the synthesis of the solid-state electrolytes powering these solid-state batteries. Current syntheses require the use of expensive materials such as Li2S and the use of expensive ball milling equipment, as described in the Japanese Patent No. JP-6683363-B2.

In an attempt to lower these production costs, companies have turned to solution methods to produce the solid-state electrolyte. While these solution methods remove the need for capital-heavy, ball milling equipment, these methods still rely on expensive precursors to produce the desired solid-state electrolytes, as described in U.S. Pat. No. 10,903,518. The high cost of production limits mass adoption of current, lithium solid-state battery technologies.

The present disclosure provides a solution to those outstanding problems. A synthetic method for producing sulfide solid-state electrolytes using inexpensive, alkali metal precursors in a solution-based synthesis method using capital-light, processing equipment is disclosed herein. The ability to use inexpensive precursors and capital-light processing equipment may allow for the production of solid electrolyte materials at a price attractive enough to fully enable mass adoption of solid-state battery technologies.

SUMMARY

This application describes a method of synthesizing a solid-state electrolyte, comprising dissolving a phosphorous containing compound and at least one first alkali metal material in one or more solvents to form a first solution; dissolving at least one second alkali metal material in one or more solvents to form a second solution; mixing the first solution and the second solution to create a combined solution wherein a metathesis reaction occurs in the combined solution between the at least one first alkali metal material and the at least one second alkali metal material to produce a solid-state electrolyte and one or more third alkali metal materials; precipitating the one or more third alkali metal materials to form a precipitated alkali metal material in the combined solution; removing the precipitated alkali metal material from the combined solution; and removing the one or more solvents from the combined solution to recover an isolated solid-state electrolyte.

In one embodiment, the method further includes processing the isolated solid-state electrolyte material via at least one of drying, milling, particle size reducing, and crystalizing the isolated solid-state electrolyte.

In another embodiment of the method, the one or more solvents includes at least one of an ether, an ester, a nitrile, a ketone, tetrahydrofuran, or acetonitrile.

In another embodiment, the method further comprises providing an additional solvent comprising an alcohol comprising methanol, ethanol, propanol, or butanol.

In another embodiment, the method further comprises adding a non-reactive hydrocarbon solvent in any of the solutions.

In another embodiment of the method, one or both of the first alkali metal material and the second alkali metal material comprises $Na_2S$, $K_2S$, $Rb_2S$, $Cs_2S$, NaHS, KHS, RbHS, CsHS, LiF, LiBr, LiI, $Li_2SO_4$, $Li_2CO_3$, LiGH, or $LiNO_3$.

In another embodiment of the method, one or both of the first alkali metal materials and the second alkali metal material are partially substituted for $Li_2S$ or LiHS.

In another aspect, this application describes a method of synthesizing a solid-state electrolyte, comprising dissolving a phosphorous containing compound and at least one first alkali metal material in one or more solvents to form a first solution; dissolving at least one second alkali metal material in the first solution to form a second solution; mixing the second solution wherein a metathesis reaction occurs between the at least one first alkali metal material and the at least one second alkali metal material to produce a solid-state electrolyte and one or more third alkali metal materials; precipitating the one or more third alkali metal materials to form a precipitated alkali metal material in the second solution; removing the precipitated alkali metal material from the second solution; removing the one or more solvents from the second solution to recover an isolated solid-state electrolyte.

In another embodiment of the method, one or both of the first alkali metal material and the second alkali metal material comprises $Na_2S$, $K_2S$, $Rb_2S$, $Cs_2S$, NaHS, KHS, RbHS, CsHS, LiF, LiBr, LiI, $Li_2SO_4$, $Li_2CO_3$, LiGH, or $LiNO_3$ and wherein the one or more solvents includes at least one of an ether, an ester, a nitrile, a ketone, tetrahydrofuran, an alcohol or acetonitrile.

In another aspect, this application describes method of synthesizing a solid-state electrolyte, comprising in a first solvent, forming a first solution comprising $Na_2S$ and LiCl; precipitating NaCl from the first solution; in a second solvent, forming a second solution of dissolved $Na_2S$ and $P_2S_5$; mixing the first and second solutions to form a third solution wherein a solid-state electrolyte is created; in the third solution, isolating a supernatant comprising the solid-state electrolyte from the precipitated NaCl; removing precipitated NaCl from the third solution; removing one or both of the first solvent and the second solvent from the supernatant comprising the solid-state electrolyte; and processing the solid-state electrolyte.

In another embodiment of the method, processing includes at least one of drying, milling, crystalizing and particle size reducing the solid-state electrolyte.

In another embodiment of the method, the first solvent includes at least propanol or ethanol.

In another embodiment of the method, the first solvent further includes a non-reactive hydrocarbon solvent.

In another embodiment of the method, the second solvent includes at least tetrahydrofuran, acetonitrile, and ethyl acetate.

In another embodiment of the method, the second solvent further includes a non-reactive hydrocarbon solvent.

In another embodiment of the method, isolating includes at least one of centrifuging or filtering of the third solution.

In another embodiment of the method, the $Na_2S$ in the first solution is at least partially substituted by one or more alkali metal sulfides including $Li_2S$, $Na_2S$, $K_2S$, $Rb_2S$, and $Cs_2S$.

In another embodiment of the method, the $Na_2S$ in the second solution is at least partially substituted by one or more alkali metal sulfides including $Na_2S$, $K_2S$, $Rb_2S$, and $Cs_2S$.

In another embodiment of the method, the $Na_2S$ is at least partially substituted by one or more alkali metal hydrosulfides including NaHS, KHS, RbHS, and CsHS.

In another embodiment of the method, the LiCl is at least partially substituted by one or more lithium halides and lithium salts (carbonate, sulfate, nitrate, nitride, hydroxide) supporting the metathesis reaction.

In another aspect, the application comprises solid-state electrolyte synthesized by any of the methods described herein.

In another aspect, the application comprises a lithium-based electrochemical cell comprising a solid-state electrolyte synthesized by any of the methods described herein.

BRIEF DESCRIPTION OF DRAWINGS

The present disclosure may be understood by reference to the following detailed description taken in conjunction with the drawings briefly described below. It is noted that, for purposes of illustrative clarity, certain elements in the drawings may not be drawn to scale.

DETAILED DESCRIPTION OF ILLUSTRATED EMBODIMENTS

In the following description, specific details are provided to impart a thorough understanding of the various embodiments of the disclosure. Upon having read and understood the specification, claims and drawings hereof, however, those skilled in the art will understand that some embodiments may be practiced without hewing to some of the specific details set forth herein. Moreover, to avoid obscuring the disclosure, some well-known methods, processes, devices, and systems finding application in the various embodiments described herein are not disclosed in detail.

Figure 1:
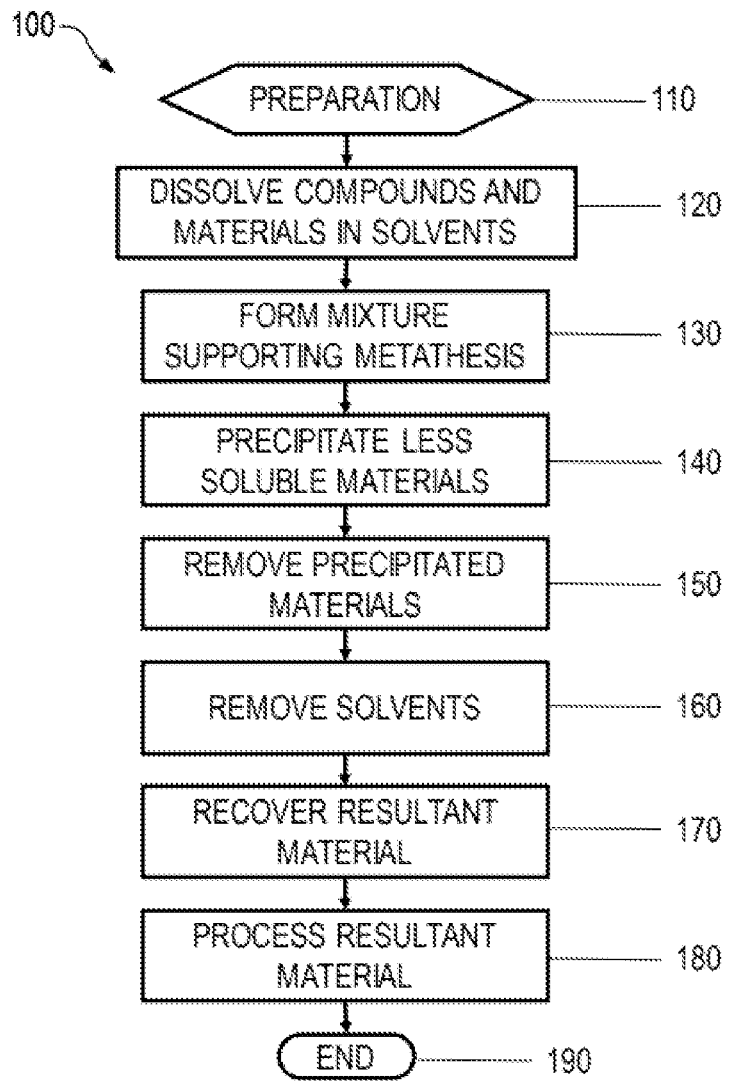
FIG. 1 is a flow chart of a process for producing a solid electrolyte material, in accordance with an embodiment.

FIG. 1 is a flow chart of a process for producing a solid electrolyte composition useful for the construction of secondary electrochemical cells. Process 100 results in highly lithium-ion-conducting crystalline, glass, and glass ceramic materials useful as solid electrolytes in lithium-based electrochemical cells without the use of $Li_2S$ as a precursor. Process 100 begins with preparation step 110 wherein any preparation action such as precursor synthesis, purification, and equipment preparation may take place.

In step 120, a phosphorous containing compound and at least one alkali metal material are dissolved in one or more solvents. Exemplary phosphorous containing compounds may include, for example, $P_4S_x$ where $3 \le x \le 10$. Specifically, the phosphorous containing compounds may include one or more of $P_4S_3$, $P_4S_4$, $P_4S_5$, $P_4S_6$, $P_4S_7$, $P_4S_8$, $P_4S_9$, or $P_4S_{10}$ ($P_2S_5$) or other appropriate compounds which result in one or more $PS_4^{3-}$ units, $P_2S_6^{4-}$ units, or $P_2S_7^{4-}$ units, as a solution or suspension. The phosphorous containing compounds are typically supplied and used in powder form, but this is not limiting, as pellets, granules, flakes, rods, or bricks can also be used. In some embodiments, it may be advantageous to incorporate one or more pnictogen compounds, such as those containing Nitrogen (N), Arsenic (Ar), Antimony (Sb), or Bismuth (Bi). Examples of Arsenic (Ar) containing materials may be one or more of but not limited to $As_2S_3$, $As_4S_4$, or $As_2S_5$. Examples of Antimony (Sb) containing materials may be one or more of but not limited to $Sb_2S_3$ or $Sb_2S_5$. An example of a Bismuth (Bi) containing material may be one or more of but not limited to $Bi_2S_3$. An example of a Nitrogen (N) containing material may be one or more of but not limited to $P_2N_5$. In some embodiments, materials containing Silicon (Si), Germanium (Ge), or Tin (Sn) may be incorporated. Silicon containing materials may be $SiS_2$. Germanium containing materials may be $GeS_2$. Tin containing materials may be $SnS_2$. Exemplary first alkali metal materials may include, for example, but are not limited to alkali metal sulfides such as $Na_2S$, $K_2S$, $Rb_2S$, and $Cs_2S$. In some embodiments, first alkali metal materials may include one or more of an alkali metal hydrosulfide, such as but not limited to NaHS, KHS, RbHS, and CsHS. In another embodiment, the first alkali metal material may be one or more of a lithium halide, such as LiCl, LiBr, or LiI. In a further embodiment, the first alkali metal may be one or more of a compound, such as, $Li_2SO_4$, $Li_2CO_3$, LiGH, $Li_3N$ or $LiNO_3$. In another embodiment, Lithium Sulfide ($Li_2S$) or Lithium polysulfide ($Li_2S_x$ where $2<x \le 10$) may be used as one of the first alkali metals, where lithium sulfide or lithium polysulfide makes up between 0% to 100% of the total first alkali metal. In a further embodiment, lithium sulfide or lithium polysulfide make up 0% to 90%, 0% to 80%, 0% to 70%, 0% to 60%, or 0% to 50% of the first alkali metal. In yet another embodiment, lithium sulfide or lithium polysulfide make up 0% to 40%, 0% to 30%, 0% to 20%, 0% to 10%, 0% to 5%, or 0% to 1% of the first alkali metal.

Exemplary solvents may include, for example, but are not limited to ethers, esters, nitriles, ketones, and alcohols. Ethers may be one or more of and not limited to Tetrohydrofuran, Diethyl ether, Dibutyl ether, dipentyl ether, Dimethoxyethane (DME), Dioxane, or Anisole. Esters may be one or more of and not limited to Ethyl acetate, Ethyl butyrate, Isobutyl acetate, Butyl acetate, Butyl butyrate and Butyl propanoate. Nitriles may be one or more of and not limited to Acetonitrile, Propionitrile, Butyronitrile, and Isobutyronitrile. Ketones, and Alcohols may be one or more of and not limited to Methanol, Ethanol, Propanol, Butanol, Isopropanol, and Isobutanol. In addition to the above-list of solvents, non-reactive hydrocarbon solvents, such as Benzene, Toluene, Xylenes, Heptane, and Octane may be added to the solvent containing a phosphorous containing material.

For step 120, the ratios and amounts of the various reactants are not specifically limited and relevant stoichiometric quantities of the precursors may be adjusted to achieve the desired product. In some embodiment, the molar ratio of phosphorous containing material to alkali metal containing material may be between 2:1 to 1:20. In another embodiment, the molar ratio of phosphorous containing material to alkali metal containing material may be between 1:1 to 1:20. In yet another embodiment, the molar ratio of phosphorous containing material to alkali metal containing material may be 1:2 to 1:20. In a further embodiment, the molar ratio of phosphorous containing material to alkali metal containing material may be 1:3 to 1:20. The amount of solvent added to the combination is not limited as long as the amount of solvent supports the desired dissolution. Furthermore, multiple solvents may be mixed together with the aforementioned compounds and materials. Additional materials, such as co-solvents or polymers, may also be added during this step.

In step 130, a mixture is formed supporting a metathesis reaction between the at least one first alkali metal material and at least one second alkali metal material. Exemplary second alkali metal materials may also include one or more lithium halides, such as LiCl, LiBr, or LiI and one or more lithium salts, such as $Li_2SO_4$, $Li_2CO_3$, LiGH, or $LiNO_3$. These materials are not limited as long as they support the metathesis reaction. In some embodiments, the second alkali metal material may be one or more of $Na_2S$ or $K_2S$. In another embodiment, the second alkali metal material may be one or more of LiHS, NaHS, KHS, or RbHS. For step 130, the ratios and amounts of the various reactants are not specifically limited.

The amount of solvent added to the combination is not limited as long as the amount of solvent supports the desired metathesis reaction. Furthermore, multiple solvents may be mixed together with the noted reactants. Additional materials, such as co-solvents or polymers, may also be added during this step. In either of steps 130 and 140, the first alkali metal material or the second alkali metal material may be partially substituted by $Li_2S$ or LiHS.

In step 140, one or more less-soluble alkali metal materials are produced as a by-product of the metathesis reaction of step 130, which precipitates from the mixture. During the precipitation process, the mixture may be mixed for a predetermined period of time and temperature. Mixing time is not specifically limited as long as it allows for appropriate homogenization and propagation of the precipitation process. Mixing temperature is not specifically limited as long as it allows for appropriate mixing and reaction kinetics. For example, appropriate mixing may be accomplished over 0.1 minutes to 100 hours at a temperature ranging from −40° C. to 150° C. Mixing may be accomplished by means of stirring, blending, or grinding.

In step 150, the precipitated alkali metal by-product materials are removed from the mixture by, for example but not limited to, centrifugation and/or filtering. Prior to the removal of the alkali metal by-product materials, polymers or flocculants may be added. During step 150, the mixture may be cooled to further drive the precipitation of one or more of the alkali metal by-product materials. The mixture may be cooled to a temperature lower than 20° C., or lower than 10° C., or lower than 0° C., or lower than −10° C., or lower than −20° C., or lower than −30° C.

In step 160, solvents may be removed via spray drying in an inert atmosphere such as argon or nitrogen, a reactive atmosphere such as $H_2S$ or sulfur, or by vacuum drying under vacuum for 0.1 hours to 100 hours, or 0.25 hours to 50 hours, or 0.5 hour to 25 hours, or 0.75 hour to 10 hours, or 1 hour to 5 hours. The temperature of the vacuum drying may be between 10° C. and 250° C., or 25° C. and 200° C., or 50° C. and 150° C. The drying time and temperature is not limited as long as 50% of the solvent is removed. In some embodiment the drying process removes more than 65% of the solvent, or more than 75%, or, more than 80%, or more than 85%, or more than 90%, or more than 95% or more than 99%.

Once the solvent is removed, the resultant solid-state electrolyte material is recovered in step 170 and may be further optionally processed in step 180. Processing may include actions, such as drying, milling, particle size reducing, crystalizing, or exposure to a reactive atmosphere such as $H_2S$ or sulfur.

In step 190, processed material may be combined with other materials required to form one or more layers of an electrochemical cell. The method 100 is not limited, unless otherwise specified or understood by those of ordinary skill in the art, to the order shown in FIG. 1.

The following reactions below express the efficacy of the process described above. Although the following reactions are described synthesizing lithium-based electrolyte compounds, sodium-based electrolyte compounds may also be synthesized.

Reaction 1.

$$P_2S_5 + 3Na_2S \rightarrow 2Na_3PS_4 \quad\quad 1.1$$

$$Na_3PS_4 + 3LiBr \rightarrow Li_3PS_4 + 3NaBr \quad\quad 1.2$$

In step 1.1 of Reaction 1, the $P_2S_5$ and $Na_2S$ would be placed in one or more solvents selected from ethers, esters, or nitriles. Non-reactive solvents such as xylenes, toluene, benzene, heptane or octane may be added, e.g., in step 120, to form $Na_3PS_4$. Without removing the solvent from step 1.1, LiBr would be added to the mixture of step 1.2, which is step 130 of process 100. The LiBr should dissolve and generate a metathesis reaction with the $Na_3PS_4$ forming $Li_3PS_4$ and NaBr. In this example, the metathesis reaction occurs in conjunction with one or more solvents, as described above. To further drive the metathesis reaction, one or more alcohols, such as methanol, ethanol, propanol, or butanol may be used. When an alcohol is added, any remaining $Na_3PS_4$ or the newly formed $Li_3PS_4$ may dissolve. This should further drive and complete the metathesis reaction and allow for the NaBr, the alkali metal by-product, to be removed by one or more of filtering or centrifuging. The solvent in the isolated solution of $Li_3PS_4$ may then be removed and the $Li_3PS_4$ may be crystalized.

Reaction 2.

$$P_2S_5 + 3Na_2S \rightarrow 2Na_3PS_4 \quad\quad 2.1$$

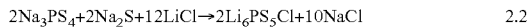

$$2Na_3PS_4 + 2Na_2S + 12LiCl \rightarrow 2Li_6PS_5Cl + 10NaCl \quad\quad 2.2$$

In step 2.1 of Reaction 2, the $P_2S_5$ and $Na_2S$ would be placed in one or more solvents selected from ethers, esters, or nitriles. Non-reactive solvents, such as xylenes, toluene, benzene, heptane or octane may be added e.g., in step 120, to form $Na_3PS_4$. A second reactive solvent may then be added to the reacted mixture, along with an alkali metal halide and additionally an alkali metal sulfide according to reaction 2.2, e.g., in step 130. The second solvent should be selected such that the product of Reaction Step 2.1, $Na_3PS_4$, the alkali metal halide, LiCl, and additionally alkali metal sulfide, $Na_2S$, dissolve and generate a metathesis reaction, step 130. The second solvent should be one or more of an alcohol, such as such as methanol, ethanol, propanol, or butanol. In this Reaction, the metathesis reaction occurs within one or more solvent as described above. When the second solvent is added, the mixture should be mixed for a period of time, such that the metathesis reaction comes to a completion. After such time, the lithium containing material should be fully dissolved, allowing for the NaCl, the alkali metal by-product, to be removed by one or more of filtering or centrifuging. The solvent in the isolated solution of $Li_6PS_5Cl$ may then be removed and the $Li_6PS_5Cl$ may be crystalized.

Figure 2:
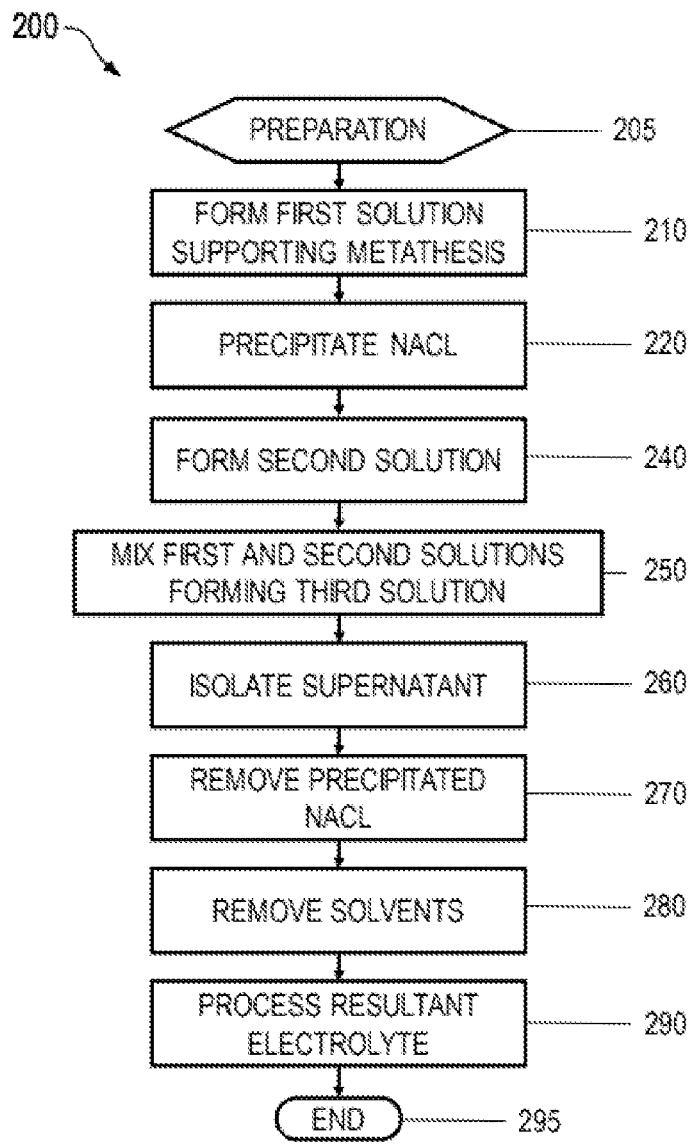
FIG. 2 is a second flow chart of a process for producing a solid electrolyte material, in accordance with an embodiment.

FIG. 2 is a flow chart of a process 200 for producing a solid electrolyte composition useful for the construction of secondary electrochemical cells. Process 200 results in highly lithium-ion-conducting crystalline, glass, and glass ceramic materials useful as solid electrolytes in lithium-based electrochemical cells without the use of $Li_2S$ as a precursor. Process 200 includes preparation step 205 wherein any preparation action, such as precursor synthesis, purification, and equipment preparation may take place.

In step 210, in a first solvent, a first solution supporting a metathesis reaction of $Na_2S$ and LiCl is formed. The sodium and lithium containing compounds are typically supplied and used in powder forms but may be in the form not limited to granules, pellets, flakes, or bricks. Exemplary solvents should be selected such that they enable a metathesis reaction between one or more alkali metal materials. These solvents may include, for example, but are not limited to alcohols, ethers, esters, nitriles, and ketones. Alcohols may be one or more of and not limited to Methanol, Ethanol, Propanol, Butanol, Isopropanol, and Isobutanol. Ethers may be one or more of and not limited to Tetrohydrofuran, Diethyl ether, Dibutyl ether, Dipentyl ether, Dimethoxyethane (DME), Dioxane, or Anisole. Esters may be one or more of and not limited to Ethyl acetate, Ethyl butyrate, Isobutyl acetate, Butyl acetate, Butyl butyrate and Butyl propanoate. Nitriles may be one or more of and not limited to Acetonitrile, Propionitrile, Butyronitrile, and Isobutyronitrile. In addition to the list of solvents, non-reactive hydrocarbon solvents, such as Benzene, Toluene, Xylenes, Heptane, and Octane may be added. In step 210, $Na_2S$ and LiCl may each be, at least partially, substituted for $Li_2S$ and LiHS respectively. LiCl may be substituted for one or more lithium halides such as LiF, LiBr, or LiI and/or one or more lithium salts, such as $Li_2SO_4$, $Li_2CO_3$, LiOH, or $LiNO_3$ as long as the substitution does not hinder the metathesis reaction. $Na_2S$ may each be, at least partially, substituted for one or more of a $K_2S$, $Rb_2S$, or $Cs_2S$. In another embodiment, $Na_2S$ may each be, at least partially, substituted for one or more of a LiHS, NaHS, KHS, or RbHS.

For step 210, the ratios and amounts of the various reactants are not specifically limited and may, for example range from 2:1 to 1:20 molar equivalent of a $P_2S_5$ or other phosphorous containing materials to the molar equivalent of an alkali metal compound. In another embodiment, the molar ratio of phosphorous containing material to alkali metal containing material may be between 1:1 to 1:20. In yet another embediment, the molar ratio of phosphorous containing material to alkali metal containing material may be between 1:2 to 1:20. In a further embodiment, the molar ratio of phosphorous containing material to alkali metal containing material may be between 1:3 to 1:20. The amount of solvent added to the combination is not limited as long as the amount of solvent supports the desired dissolution. Furthermore, multiple solvents may be mixed together with the noted compounds and materials. Additional materials, such as co-solvents or polymers, may also be added during this step.

In step 220, NaCl is precipitated from the mixture. In some embodiments, when sulfide or hydrosulfide of potassium (K), rubidium (Rb) or cesium (Cs) are used in the synthesis, the precipitate may also contain one or more of a potassium (K), rubidium (Rb) or cesium (Cs). In another embodiment, when an alkali metal salt containing fluorine (F), bromine (Br), or iodine (I) is used in the synthesis, the precipitate may also contain one or more of a fluorine (F), bromine (Br), or iodine (I). In yet another embodiment, when one or more alkali metal salt containing sulfate ($SO_4$), carbonate ($CO_3$), hydroxide (OH), or nitrate ($NO_3$) is used in the synthesis, the precipitate may also contain one or more of a sulfate ($SO_4$), carbonate ($CO_3$), hydroxide (OH), or nitrate ($NO_3$). During precipitation, the mixture may be mixed for a predetermined period of time and temperature. Mixing time is not specifically limited as long as it allows for appropriate homogenization and propagation of the precipitation. Mixing temperature is not specifically limited as long as it allows for appropriate mixing and reaction kinetics. For example, appropriate mixing may be accomplished over 0.1 minutes to 100 hours at a temperature ranging from −40° C. to 150° C. Mixing may be accomplished using, for example, conventional means, such as stirring or blending. In the cases of high solids loading or larger particle sizes, mixing incorporating grinding action may be included. Typically, reaction/stir times for step 220 may be between a few minutes and a few hours. In some embodiment the precipitated NaCl or other alkali metal by-product materials may be removed prior to step 250. Prior to the removal of the NaCl or other alkali metal by-product materials, polymers or flocculants may be added. Additionally, the mixture may be cooled to further drive the precipitation of one or more of the alkali metal by-product materials. The mixture may be cooled to a temperature lower than 20° C., or lower than 10° C., or lower than 0° C., or lower than −10° C., or lower than −20° C., or lower than −30° C. The NaCl or other alkali metal by-product materials may be removed from the mixture by, for example but not limited to, centrifugation and/or filtering. In some embodiments, once the NaCl or other alkali metal by-product materials are removed, LiCl may be added to the degree such that the desired stoichiometric amount is reached. In some embodiments, the LiCl is fully or partially substituted for one or more of LiF, LiBr, or LiI.

In step 240, a second solution of dissolved $Na_2S$ and $P_2S_5$ is formed using a second solvent. The $P_2S_5$ may be fully or partially substituted for phosphorous containing compounds such as $P_4S_x$ where $3 \leq x \leq 10$. Specifically, the phosphorous containing compounds may include one or more of $P_4S_3$, $P_4S_4$, $P_4S_5$, $P_4S_6$, $P_4S_7$, $P_4S_8$, or $P_4S_9$ or other appropriate compounds which result in $PS_4^{3-}$ units as a solution or suspension. The phosphorous containing compounds are typically supplied and used in powder form, but this is not limiting as it can also be in the form as pellets, granules, flakes, rods, or bricks. In some embodiments, it may be advantageous to incorporate one or more pnictogen compounds, such as those containing Nitrogen (N), Arsenic (Ar), Antimony (Sb), or Bismuth (Bi). Examples of Arsenic (Ar) containing materials may be one or more of but not limited to $As_2S_3$, $As_4S_4$, or $As_2S_5$. Examples of Antimony (Sb) containing materials may be one or more of but not limited to $Sb_2S_3$ or $Sb_2S_5$. An example of a Bismuth (Bi) containing material may be one or more of but not limited to $Bi_2S_3$. An example of a Nitrogen (N) containing material may be one or more of but not limited to $P_2N_5$. In some embodiments, materials containing Silicon (Si), Germanium (Ge), or Tin (Sn) may be incorporated. Silicon containing materials may be $SiS_2$. Germanium containing materials may be $GeS_2$. Tin containing materials may be $SnS_2$.

Exemplary solvents may include, for example, but are not limited to ethers, esters, nitriles, ketones, and alcohols.

Ethers may be one or more of and not limited to Tetrohydrofuran, Diethyl ether, Dibutyl ether, Dipentyl ether, Dimethoxyethane (DME), Dioxane, or Anisole. Esters may be one or more of and not limited to Ethyl acetate, Ethyl butyrate, Isobutyl acetate, Butyl acetate, Butyl butyrate and Butyl propanoate. Nitriles may be one or more of and not limited to Acetonitrile, Propionitrile, Butyronitrile, and Isobutyronitrile. Ketones, and Alcohols may be one or more of and not limited to Methanol, Ethanol, Propanol, Butanol, Isopropanol, and Isobutanol. In addition to the list of solvents, non-reactive hydrocarbon solvents such as Benzene, Toluene, Xylenes, Heptane, and Octane may be added to the solvent containing a phosphorous containing material.

In step 250, the first and second solutions are mixed forming a third solution which precipitates additional NaCl. In some embodiments, when a sulfide or hydrosulfide of potassium (K), rubidium (Rb) or cesium (Cs) are used in the synthesis, the precipitate may also contain one or more of a potassium (K), rubidium (Rb) or cesium (Cs). In another embodiment, when an alkali metal salt containing fluorine (F), bromine (Br), or iodine (I) is used in the synthesis, the precipitate may also contain one or more of a fluorine (F), bromine (Br), or iodine (I). In yet another embodiment, when one or more alkali metal salt containing sulfate ($SO_4$), carbonate ($CO_3$), hydroxide (OH), or nitrate ($NO_3$) is used, the precipitate may also contain one or more of a sulfate ($SO_4$), carbonate ($CO_3$), hydroxide (OH), or nitrate ($NO_3$).

In step 260, the supernatant may be isolated from the precipitated NaCl or other alkali metal salt by-product and removed in step 270. The precipitated NaCl or other alkali metal salt by-product may be removed from the mixture by, for example, centrifugation and/or filtering. During step 270, the mixture may be cooled to further drive the precipitation of one or more of the alkali metal by-product materials. The mixture may be cooled to a temperature lower than 20° C., or lower than 10° C., or lower than 0° C., or lower than −10° C., or lower than −20° C., or lower than −30° C. In either of the first and second solutions, $Na_2S$ may be substituted by, for example, but are not limited to alkali metal sulfides including $Li_2S$, $K_2S$, $Rb_2S$, and $Cs_2S$ and alkali metal hydrosulfides including LiHS, NaHS, KHS, RbHS, and CsHS.

In step 280, solvents may be removed via spray drying in an inert atmosphere, such as argon or nitrogen or by vacuum drying under vacuum for 0.1 hours to 100 hours, or 0.25 hours to 50 hours, or 0.5 hour to 25 hours, or 0.75 hour to 10 hours, or 1 hour to 5 hours. The temperature of the vacuum drying may be between 10° C. and 250° C., or 25° C. and 200° C., or 50° C. and 150° C. The drying time and temperature is not limited as long as 50% of the solvent is removed. In some embodiments, the drying process removes more than 65% of the solvent, or more than 75%, or, more than 80%, or more than 85%, or more than 90%, or more than 95% or more than 99% of the solvent. Once the solvent is removed, the resultant solid-state electrolyte material is recovered and may be further processed in step 290. Processing may include actions, such as, drying, milling, particle size reducing, and crystalizing. Process 200 ends with step 295. Subsequently, processed material may be combined with other materials required to form one or more layers of an electrochemical cell. The method 200 is not limited, unless otherwise specified or understood by those of ordinary skill in the art, to the order shown in FIG. 2.

The following Reactions below express the efficacy of the process described above. Although the following Reactions are described synthesizing Lithium-based electrolyte compounds it should be understood that Sodium-based electrolyte compounds may be synthesized also.

Reaction 3.

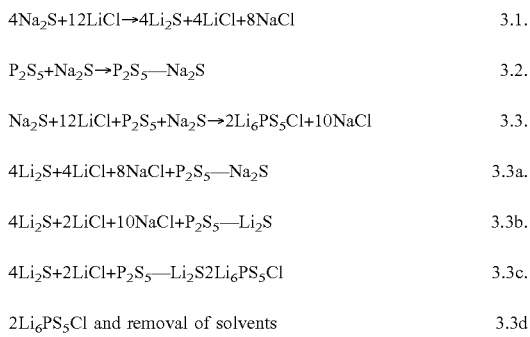

$$4Na_2S + 12LiCl \rightarrow 4Li_2S + 4LiCl + 8NaCl \qquad 3.1.$$

$$P_2S_5 + Na_2S \rightarrow P_2S_5\text{—}Na_2S \qquad 3.2.$$

$$Na_2S + 12LiCl + P_2S_5 + Na_2S \rightarrow 2Li_6PS_5Cl + 10NaCl \qquad 3.3.$$

$$4Li_2S + 4LiCl + 8NaCl + P_2S_5\text{—}Na_2S \qquad 3.3a.$$

$$4Li_2S + 2LiCl + 10NaCl + P_2S_5\text{—}Li_2S \qquad 3.3b.$$

$$4Li_2S + 2LiCl + P_2S_5\text{—}Li_2S2Li_6PS_5Cl \qquad 3.3c.$$

$$2Li_6PS_5Cl \text{ and removal of solvents} \qquad 3.3d$$

In step 3.1 of the Reaction 3, $Na_2S$ and LiCl are dissolved in propanol where a metathesis reaction between the two compounds occurs. This reaction forms $Li_2S$ and NaCl. $Li_2S$ is highly soluble in propanol and thus stays in solution while NaCl has very little solubility in propanol and precipitates out of the solution. LiCl is added to the degree that after the metathesis reaction there is still LiCl in solution to be used in a step later in the synthesis. The final products in this reaction will be $Li_2S$, NaCl, and LiCl. Once the metathesis reaction is complete, the NaCl may be removed from the mixture as described in one or more of the embodiments. In step 3.2 of Reaction 3, a separate solution is created where $P_2S_5$ and $Na_2S$ are placed in Tetrahydrofuran (THF) or in another solvent capable of causing the $P_2S_5$ and $Na_2S$ to react. Solvents of this nature may be one or more of an ether, ester, nitrile, or ketone. The two materials react and pull each other into solution. In step 3.3 of Reaction 3, the solution of step 3.1 and the solution of step 3.1 are mixed. In step 3.1a, Reaction 3 proceeds such that the LiCl goes through a metathesis reaction with the $Na_2S$ bound to the $P_2S_5$. In step 3.3b, Reaction 3 proceeds such that the $Na_2S$ is converted into NaCl and $Li_2S$ through a metathesis reaction. The newly formed $Li_2S$ may then react with the $P_2S_5$ and the newly formed NaCl precipitates out of solution because of its very low solubility in the propanol and the reactive solvent. In step 3.3c, the NaCl may then be removed by filtering or centrifuging the solution leaving only $Li_2S$, $P_2S_5$ and LiCl in the solvent mixture. In step 3.3d, the solvents are removed and the solid electrolyte material is then dried and crystalized.

EXAMPLES

A better understanding of the present disclosure will be given through the following examples and comparative examples which are merely set forth to illustrate but are not to be construed as limiting.

<Preparation of the Sulfide Solid Electrolyte Materials>

Example 1

0.991 g of $P_2S_5$ (Sigma-Aldrich Co.) was mixed with 0.696 g $Na_2S$ (Lorad Chemical Corporation) in 20 mL Acetonitrile (ACN) (Sigma-Aldrich Co.) and stirred for 30 h. 2.269 g LiCl (Sigma-Aldrich Co.) was mixed with 1.044 g $Na_2S$ in 20 mL ethanol (Sigma-Aldrich Co.) and stirred for 30 min. The ACN and ethanol solutions were then combined with mixing. During mixing of those solutions, a metathesis reaction occurred between the LiCl and $Na_2S$ producing a soluble $Li_2S$ and insoluble NaCl. Stirring of this mixture was stopped and the NaCl was allows to settle to the bottom. The solution was then decanted and added to the solution containing ACN. The ACN and ethanol mixtures were further stirred for 12 hours during which time a metathesis reaction occurred between the remaining $Na_2S$ that was contained in the ACN containing solution and the remaining LiCl that was contained in the ethanol containing solution producing a soluble $Li_2S$ and insoluble NaCl. After the final 12 hours of stirring, the mixture was passed through a filter with a pore size of 4 microns removing the insoluble NaCl. The solution was dried under vacuum at 120° C. for 12 hours to form a ceramic powder.

Example 2

The starting materials in Example 2 are the same materials as Example 1 and the procedure followed was the same, except the ceramic powder was heated to 450° C. for 30 minutes after being dried under vacuum at 120° C. for 12 hours.

Example 3

The material in Example 3 was prepared in the same manner as Example 1 except 20 mL Ethyl Acetate (EA) (Sigma-Aldrich Co.) was used in place of Acetonitrile (ACN).

Comparative Example 1

Here 0.195 g of $P_2S_5$ (Sigma-Aldrich Co.) was mixed with 0.024 g $Li_2S$ (Lorad Chemical Corporation) in 5 mL tetrahydrofuran (THF) (Sigma-Aldrich Co.) and stirred for 3 h. 0.045 g LiCl (Sigma-Aldrich Co.) was mixed with 0.097 g $Li_2S$ in 5 mL ethanol (Sigma-Aldrich Co.) and stirred for 45 min. The THF and ethanol mixtures were combined and further stirred for 15 min, and then the final mixture was dried under vacuum at 215° C. to form a ceramic powder. The ceramic powder was then heated to 400° C. for 2 hours.

Comparative Example 2

Here 10.700 g $Li_2S$ (Lorad Chemical Corporation), 10.351 g $P_2S_5$ (Sigma-Aldrich Co.), and 3.949 g LiCl (Sigma-Aldrich Co.), were added to a 250 ml zirconia milling jar with zirconia milling media and compatible solvent (e.g. xylenes or heptane). The mixture was milled in a Retsch PM 100 planetary mill for 12 hours at 500 RPM. The material is collected and dried under vacuum at 70° C. for 2 hours and then heated to 400° C. for 2 hours in inert (argon or nitrogen) environment.

<X-Ray Diffraction Spectroscopy of Sulfide-Based Solid Electrolytes>

X-ray diffraction measurements of the products of Examples 1-3 and Comparative Example 1 and 2 were carried out with a Bruker D8 Advance instrument using a copper x-ray source (Cu—Ka(1,2)=1.5418) and Lynxeye detector. Samples were sealed in home-built sample holder with a beryllium window. Measurements were taken over 5-40 degrees 2-theta with a step size of 0.02 degrees.

TABLE 1

| Example | Major Phase | Impurities Present |
| --- | --- | --- |
| Example 1 | $Li_6PS_5Cl$ | LiCl, $Li_2S$ |
| Example 2 | $Li_6PS_5Cl$ | LiCl, $Li_2S$ |
| Example 3 | $Li_6PS_5Cl$ | LiCl, $Li_2S$, $Li_3PO_4$ |
| Comparative Example 1 | $Li_6PS_5Cl$ | LiCl, $Li_2S$, $Li_3PO_4$ |
| Comparative Example 2 | $Li_6PS_5Cl$ | $Li_2S$ |

Figure 3:
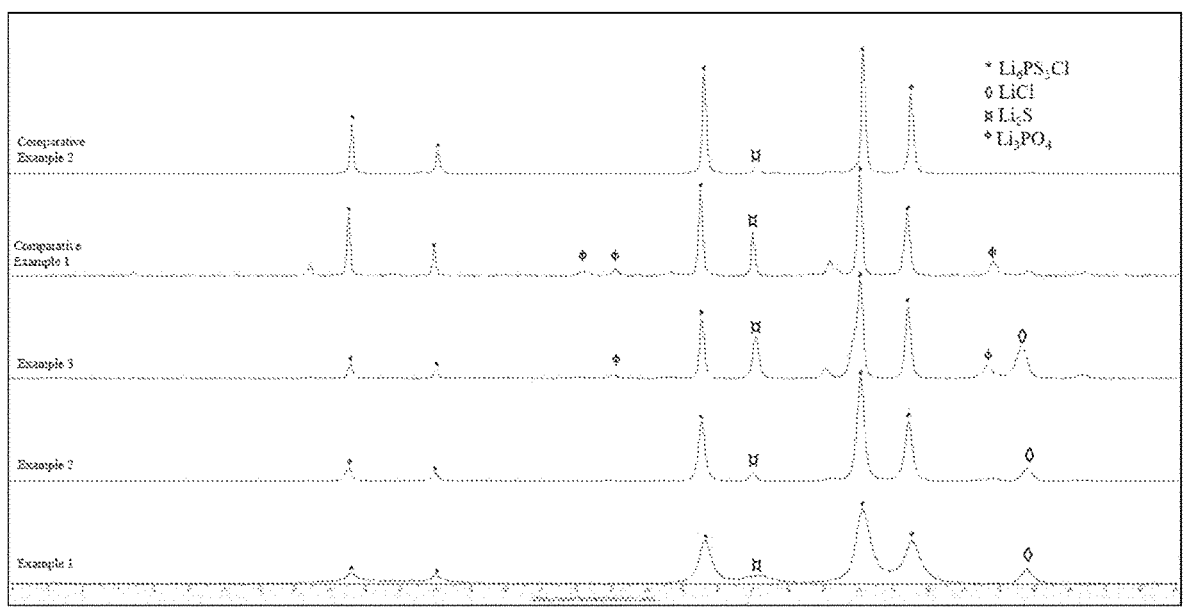
FIG. 3 is an X-Ray Diffraction spectrum of materials produced in Example 1, Example 2, Example 3, Comparative Example 1, and Comparative Example 2.

The sulfide-based solid electrolyte prepared in Examples 1-3 and Comparative Examples 1 and 2 were subjected to X-ray diffraction spectroscopy. The results of the x-ray diffraction spectroscopy are shown in FIG. 3 and summarized in Table 1. From FIG. 3, it can be observed that Examples 1-3 have peaks at 2θ=15.7°±0.2°, 18.15°±0.2°, 25.75°±0.2°, 30.25°±0.2° and 31.65°±0.2° which indicate that the sulfide-based solid electrolytes have a $Li_6PS_5Cl$ argyrodite-type crystal structure. From FIG. 3, it can be observed that Examples 1-3 are devoid of x-ray diffraction peaks at 2θ=23.45°±0.2° and 38.76°±0.2° which are associated with $Na_2S$. The presence of the x-ray diffraction peaks associated with the $Li_6PS_5Cl$ argyrodite-type sulfide solid electrolyte in FIG. 3 demonstrates that a sulfide solid electrolyte can be obtained without the use of $Li_2S$ as a starting precursor according to the preparation method described herein. In addition to the presence of the $Li_6PS_5Cl$ argyrodite-type sulfide solid electrolyte, the lack of x-ray diffraction peaks associated with $Na_2S$ in FIG. 3 demonstrates that a metathesis reaction occurs between the $Na_2S$ and the LiCl. From FIG. 3, it can be observed that Examples 1-3 are devoid of x-ray diffraction peaks at 2θ=27.4°±0.2° and 31.7°±0.2° which are associated with NaCl, demonstrating that the alkali metal by-product is NaCl, and can be removed by filtering.

<Lithium Ion Conductivity of Sulfide-Based Solid Electrolytes>

Ionic conductivity was measured by loading the ceramic powder into a pellet die with 16 mm diameter, and the ceramic powder was compacted to 300 MPa for 2 minutes using a benchtop hydraulic press. Compaction pressure was released and a measurement pressure of 8 MPa was applied forming a cell. The cell was connected to a Biologic 5P300 electrochemical workstation and complex impedance was measured over 7 MHz-1 Hz using 100 mV excitation. The resulting spectra was fit and used to calculate ionic conductivity. These results are summarized in Table 2.

TABLE 2

| Example | Ionic Conductivity (@25° C., mS/cm) | Crystallization Temperature (° C.) |
| --- | --- | --- |
| Example 1 | 0.062 | 120 |
| Example 2 | 1.27 | 450 |
| Example 3 | 0.10 | 450 |
| Comparative Example 1 | 0.068 | 400 |
| Comparative Example 2 | 2.05 | 400 |

From the lithium ionic conductivity result for Example 2 as shown in Table 2, it can be observed that a sulfide solid electrolyte having a conductivity greater than 1.0 mS/cm. Therefore, according to the preparation method of the present invention, a sulfide solid electrolyte having high ion conductivity can be obtained. Comparing Example 2 to Comparative Example 1, it can be observed that a sulfide solid electrolyte prepared through the method of the present invention can have a higher ionic conductivity than a method that involves the use of fully dissolving its starting precursors of which includes $Li_2S$. Comparing Example 2 to Comparative Example 2, it can be observed that the sulfide solid electrolytes prepared through their respective methods both have ionic conductivities greater than 1.0 mS/cm. However, Comparative Example 2 uses $Li_2S$ as a starting precursor and requires ball milling to synthesis the desired electrolyte material. Furthermore, it may be understood that the ionic conductivity the sulfide solid electrolyte produced by the method of the present invention may be further increased by changing one or more of the synthesis conditions, drying conditions, or crystallization conditions.

Features described above as well as those claimed below may be combined in various ways without departing from the scope hereof. It should thus be noted that the matter contained in the above description or shown in the accompanying drawings should be interpreted as illustrative and not in a limiting sense. The following claims are intended to cover generic and specific features described herein, as well as all statements of the scope of the present method and system, which, as a matter of language, might be said to fall there between.

Throughout the drawings, the same reference numerals will refer to the same or like elements. For the sake of clarity, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element. Similarly, the "second" element could also be termed a "first" element. As used herein, the singular forms are intended to include the plural forms as well, unless the context clearly indicates otherwise.

It will be further understood that the terms "comprise", "include", "have", etc. when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. In contrast, when an element such as a layer, film, area, or sheet is referred to as being "under" another element, it can be directly under the other element, or intervening elements may be present therebetween.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between the valid integers within the stated range, such as 5.5, 6.5, 7.5, 5.5 to 8.5, 6.5 to 9, and the like. Also, for example, the range of "10% to 30%" will be understood to include any subranges, such as 10% to 15%, 12% to 18%, 20% to 30%, etc., as well as all integers including values of 10%, 11%, 12%, 13% and the like and up to 30%, and will also be understood to include any value between the valid integers within the stated range, such as 10.5%, 15.5%, 25.5%, and the like.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about.".

What is claimed:

1. A method of synthesizing a solid-state electrolyte, comprising:
   dissolving a phosphorous containing compound and at least one a first alkali metal material in a first solvent to form a first solution;
   dissolving a second alkali metal material in a second solvent to form a second solution;
   mixing the first solution and the second solution to create a combined solution wherein a metathesis reaction occurs in the combined solution between the first alkali metal material and the second alkali metal material to produce a solid-state electrolyte and a third alkali metal material;
   precipitating the third alkali metal material to form a precipitated alkali metal material in the combined solution;
   removing the precipitated alkali metal material from the combined solution;
   removing the first solvent and the second solvent from the combined solution to recover an isolated solid-state electrolyte.

2. The method as recited in claim 1 further including processing the isolated solid-state electrolyte material via at least one of drying, milling, particle size reducing, and crystalizing the isolated solid-state electrolyte.

3. The method as recited in claim 1 wherein the first solvent, the second solvent, or both include at least one of an ether, an ester, a nitrile, a ketone, tetrahydrofuran, or acetonitrile.

4. The method as recited in claim 1 further comprising providing an additional solvent to the combined solution, the additional solvent comprising an alcohol comprising methanol, ethanol, propanol, or butanol.

5. The method as recited in claim 3 further comprising adding a non-reactive hydrocarbon solvent in any of the solutions.

6. The method as recited in claim 1 wherein one or both of the first alkali metal material and the second alkali metal material comprises $Na_2S$, $K_2S$, $Rb_2S$, $Cs_2S$, NaHS, KHS, RbHS, CsHS, LiF, LiBr, LiI, $Li_2SO_4$, $Li_2CO_3$, LiOH, or $LiNO_3$.

7. The method as recited in claim 1 wherein one or both of the first alkali metal materials and the second alkali metal material are partially substituted for $Li_2S$ or LiHS.

8. A method of synthesizing a solid-state electrolyte, comprising:
   dissolving a phosphorous containing compound and at least one first alkali metal material in one or more solvents to form a first solution;
   dissolving at least one second alkali metal material in the first solution to form a second solution;
   mixing the second solution wherein a metathesis reaction occurs between the at least one first alkali metal material and the at least one second alkali metal material to produce a solid-state electrolyte and one or more third alkali metal materials;
   precipitating the one or more third alkali metal materials to form a precipitated alkali metal material in the second solution;
   removing the precipitated alkali metal material from the second solution; and removing the one or more solvents from the second solution to recover an isolated solid-state electrolyte.

9. The method as recited in claim 8 wherein one or both of the first alkali metal material and the second alkali metal material comprises $Na_2S$, $K_2S$, $Rb_2S$, $Cs_2S$, NaHS, KHS, RbHS, CSHS, LIF, LiBr, LiI, $Li_2SO_4$, $Li_2CO_3$, LiOH, or $LiNO_3$ and wherein the one or more solvents includes at least one of an ether, an ester, a nitrile, a ketone, tetrahydrofuran, an alcohol or acetonitrile.

10. A solid-state electrolyte synthesized by the method of claim 1.

11. A solid-state electrolyte synthesized by the method of claim 8.

12. A lithium-based electrochemical cell comprising a solid-state electrolyte synthesized by the method of claim 1.

13. A lithium-based electrochemical cell comprising a solid-state electrolyte synthesized by the method of claim 8.

* * * * *

UNITED STATES PATENT AND TRADEMARK OFFICE
CERTIFICATE OF CORRECTION

PATENT NO. : 12,159,971 B2
APPLICATION NO. : 17/643745
DATED : December 3, 2024
INVENTOR(S) : Carlson et al.

Page 1 of 1

It is certified that error appears in the above-identified patent and that said Letters Patent is hereby corrected as shown below:

In the Claims

In Claim 1, Column 14, Lines 7-8, after 'and' delete "at least one".

Signed and Sealed this
Twenty-fifth Day of March, 2025

Coke Morgan Stewart
*Acting Director of the United States Patent and Trademark Office*